(No Model.)

C. L. SHEARER.
MEASURING MECHANISM FOR CHEESE FACTORIES.

No. 534,921. Patented Feb. 26, 1895.

Witnesses.
Edwin Walker
F. Einfeldt

Inventor
Charles L. Shearer
By ...
Atty.

UNITED STATES PATENT OFFICE.

CHARLES L. SHEARER, OF EDINBOROUGH, PENNSYLVANIA.

MEASURING MECHANISM FOR CHEESE-FACTORIES.

SPECIFICATION forming part of Letters Patent No. 534,921, dated February 26, 1895.

Application filed September 29, 1894. Serial No. 524,430. (No model.)

*To all whom it may concern:*

Be it known that I, CHARLES L. SHEARER, a citizen of the United States, residing at Edinborough, in the county of Erie and State of Pennsylvania, have invented certain new and useful Improvements in Whey-Measuring Mechanism for Cheese-Factories; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in whey measuring mechanism for cheese factories.

In the operation of cheese factories, the whey produced is delivered to each patron of the factory in proportion to the amount of milk delivered by such patron. This whey is stored in a tank at one end of the factory, frequently at some distance from the factory, and difficulty has heretofore been experienced in delivering the proper amount of whey to the customer, without having a man at the tank to measure it out. To overcome this difficulty I have devised an apparatus by means of which the employé receiving the milk is enabled to measure out the proper amount of whey to be delivered at the whey tank to the customer, without leaving his position at the place where the milk is received from the customer. This is done by making the whey tank in two compartments, one of which operates as a storage tank, and the other as a delivery tank, a valve connecting the two compartments, whereby the proper quantity of whey can be let into the delivery compartment, and mechanism for operating this valve, and a float in said delivery compartment, which operates register mechanism, both at the whey tank and at the point where the operator is stationed, all of which is hereinafter fully described and illustrated in the accompanying drawings, in which—

Figure 1:
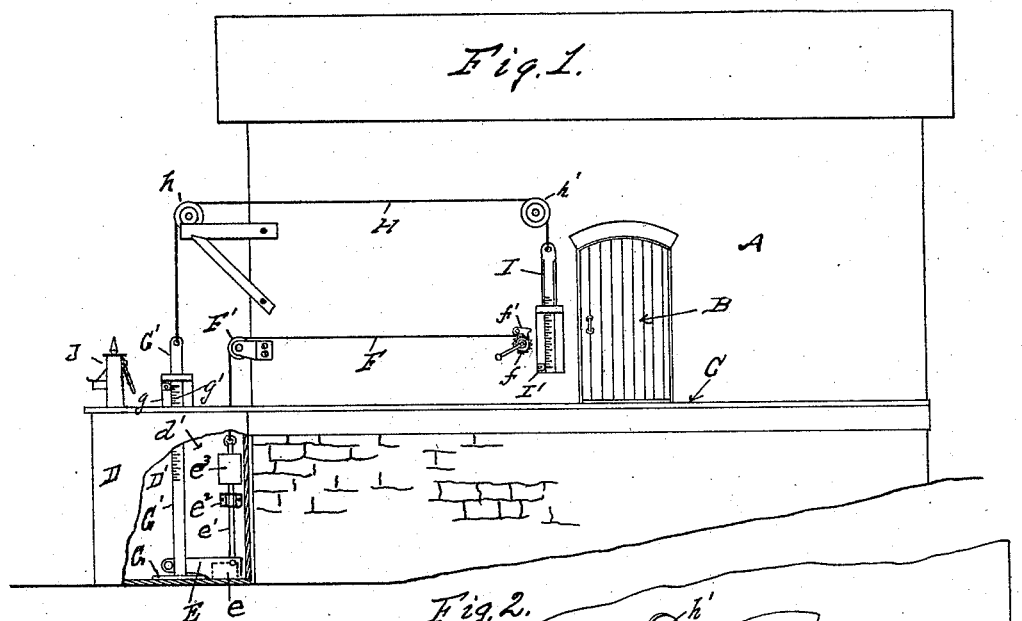
Figure 2:
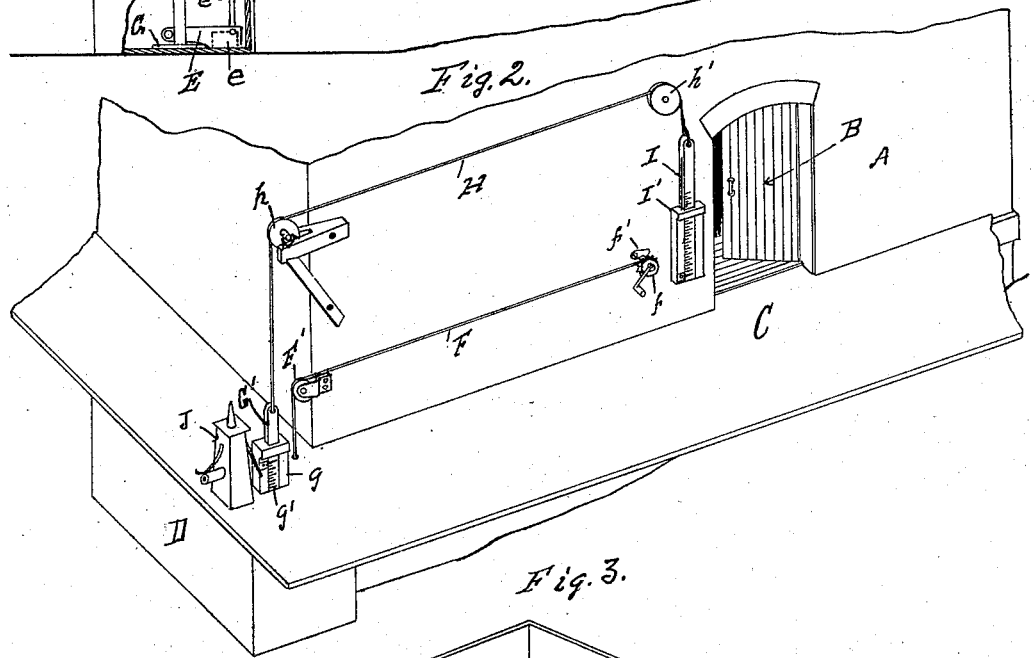
Figure 3:
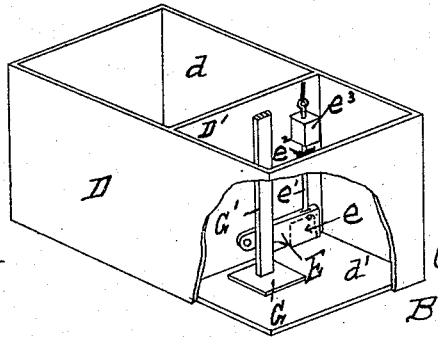

Figure 1. is a side elevation of a cheese factory and whey tank embodying my improvements. Fig. 2. is a perspective view of the same. Fig. 3. is a perspective view of the whey tank with the cover removed and parts thereof broken away.

In the drawings illustrating my invention A represents a cheese factory, B the door where the milk is received from customers and C the platform in front thereof and D the whey tank at one end of the factory. This whey tank D is made of two compartments $d$ a storage compartment and $d'$ a delivery compartment, separated by a division wall D'. In the lower part of this division wall D' there is an opening $e$ (shown in dotted lines) adapted to be closed by a valve E. (See Figs. 1 and 3.) This valve E is provided with a stem $e'$ which projects upward through a guide $e^2$ and is provided with a weight $e^3$, so that it will automatically close. For opening this valve a cord F is attached to the stem $e'$ which extends up over a sheave F' and along the side of the building to a ratchet winch $f$ by means of which the valve $e$ can be opened to allow the whey to flow from the storage compartment $d$ into the delivery compartment $d'$, but when the dog $f'$ is released from the winch the weighted valve $e$ automatically closes.

In the delivery compartment $d'$ of the whey tank D there is a vertically moving float G provided with a stem G' which passes up between guides $g$ on the top of the tank. This stem is provided with a scale $g'$ which indicates to the customer the distance the float rises above the bottom of the tank, and thereby shows to him the amount of whey he is getting. A cord H is connected to the upper end of the float-stem G' which passes up over a sheave $h$ and along the side of the building to a point near the winch $f$ when it passes over another sheave $h'$ and down to and connects with the upper end of a vertically moving scale bar I which moves up and down in guides I' according to the rise or fall of the float G, this also indicating the rise of the float to the employé receiving the milk, and enabling him to know when to close the valve $e$. Thus it will be seen that the operator receiving the milk has at all times the control of the delivery of the whey from the whey tank.

In the drawings the whey tank is shown at one end of the building, but it is manifest that it can be located at any convenient point desired.

J is a pump, of approved construction, by means of which the customer pumps his whey out of the compartment $d'$ into any suitable vessel.

What I claim is—

In a measuring apparatus, the combination, with a tank divided into two compartments $d$ $d'$ by a partition, and provided with a lid; of a weighted valve normally closing an aperture at the bottom of the said partition, a winch provided with a ratchet wheel and a pawl, a cord connecting the said winch with the said valve, a float in the delivery compartment $d'$ provided with a stem projecting through the said lid and bearing a graduated scale, a second similar graduated scale arranged in proximity to the said winch, a cord connecting the two said scales, and guide sheaves for the said cords, substantially as and for the purpose set forth.

In testimony whereof I affix my signature in presence of two witnesses.

CHARLES L. SHEARER.

Witnesses:
M. S. GILLESPIE,
J. H. BENNETT.